March 1, 1932.  P. E. MATTHEWS  1,847,126
TESTING DEVICE FOR STEERING MECHANISM
Filed Nov. 26, 1929   2 Sheets-Sheet 1

Inventor:
Philip E. Matthews
By his Attorneys
Redding, Greeley, O'Shea & Campbell

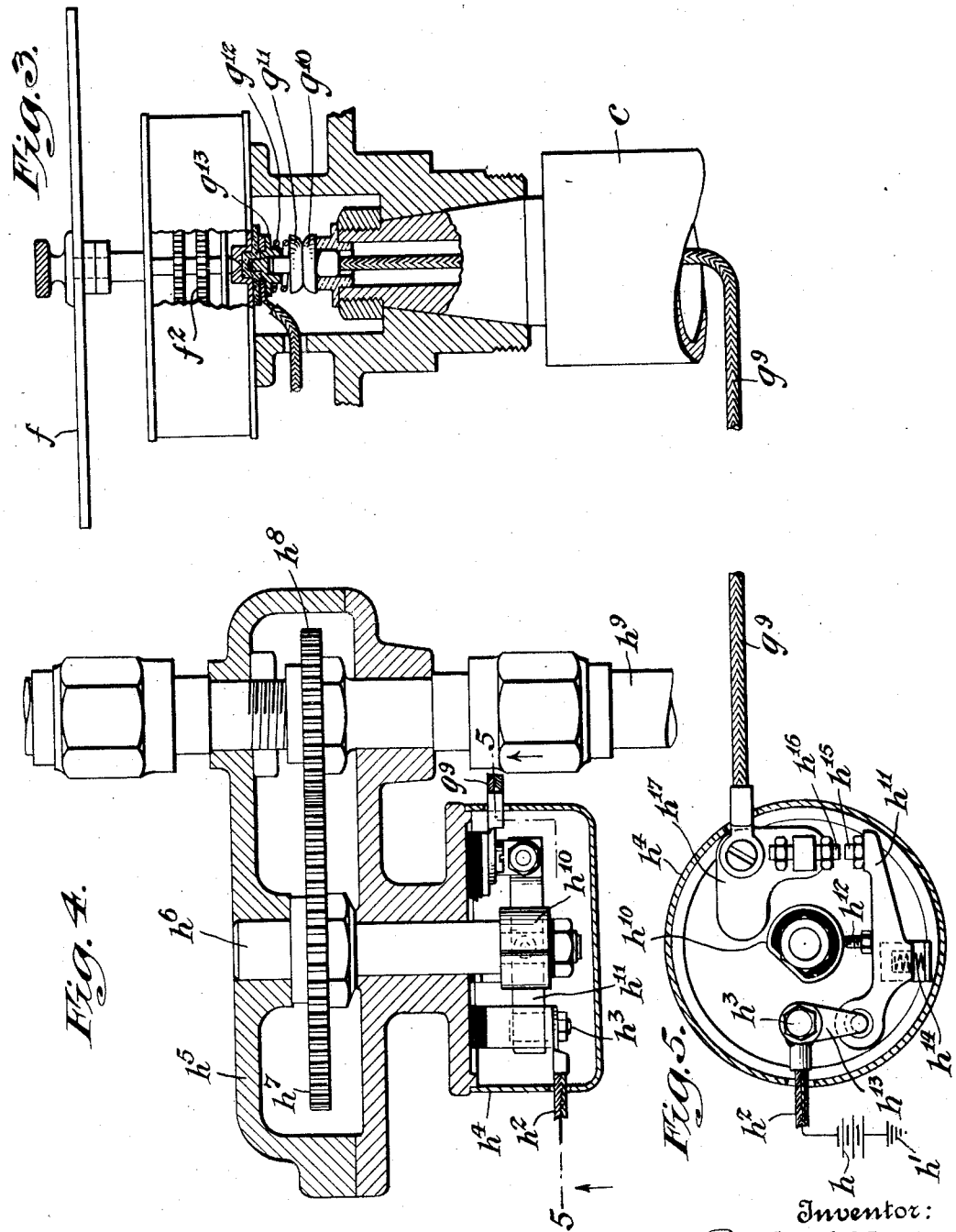

Patented Mar. 1, 1932

1,847,126

UNITED STATES PATENT OFFICE

PHILIP E. MATTHEWS, OF PLAINFIELD, NEW JERSEY, ASSIGNOR TO INTERNATIONAL MOTOR COMPANY, OF NEW YORK, N. Y., A CORPORATION OF DELAWARE

TESTING DEVICE FOR STEERING MECHANISM

Application filed November 26, 1929. Serial No. 409,818.

The present invention relates to testing devices for the steering mechanisms of motor vehicles and embodies, more specifically, an improved testing device adapted to be mounted between the steering column and steering wheel of a motor vehicle to record the operation of the steering mechanism over a predetermined time and distance.

For the intelligent testing of the steering mechanism of automotive vehicles, it is important that an instrument be provided by means of which the steering effort can be accurately determined and permanently recorded during a given test. In this manner, the personal equation of the operator of the vehicle need not be relied upon and the actual conditions of operation for given steering mechanisms may be accurately determined and compared with desired standards.

Accordingly, it is an object of this invention to provide a testing mechanism for steering devices to determine accurately and permanently the characteristics of steering mechanisms.

A further object of the invention is to provide a testing device of the above character which functions independently of the operator of the vehicle and accurately records the characteristics of the steering mechanism.

A further object of the invention is to provide a testing device of the above character in which the parts thereof are simple in construction and readily manufactured and assembled, the disposition thereof being such that they are readily accessible for inspection.

Further objects, not specifically enumerated above, will be apparent as the invention is described in greater detail in connection with the accompanying drawings, wherein:

Figure 3 is an enlarged view in section, similar to Figure 2, and showing the electrical connections for the testing mechanism.

Figure 4 is an enlarged view in section, showing a circuit closing device constructed in accordance with the present invention.

Figure 5 is a view in section, taken on line 5—5 of Figure 4, showing a circuit closing device for supplying current to the testing mechanism intermittently, constructed in accordance with the present invention.

Referring to the above drawings, $a$ designates a steering wheel having spiders $a'$ which are formed with a common hub $a^2$ journaled upon the steering column at $a^3$. These spiders mount a housing $a^4$ which may be formed with a transparent window $a^5$ by means of which the testing mechanism may be observed.

An annular base $b$ is secured to the spiders by means of bolts $b'$, this base carrying upwardly projecting lugs $b^2$ against which springs $b^3$ are seated and within which adjusting mechanisms $b^4$ are provided to vary the tension of the respective springs. Lugs $b^2$ are spaced in pairs about the annular base $b$ and are adapted to receive corresponding pairs of springs $b^3$.

The usual steering $c$ carries a removable collar $c'$ upon which diverging arms $c^2$ are formed. These arms are received between the pairs of lugs $b^2$ and are formed with centering lugs $c^3$ for positioning the springs $b^3$. Such springs are seated upon the opposite face of each arm and thus yieldingly transmit the torque between the steering wheel and steering column incident to the steering of the vehicle.

Figure 1:
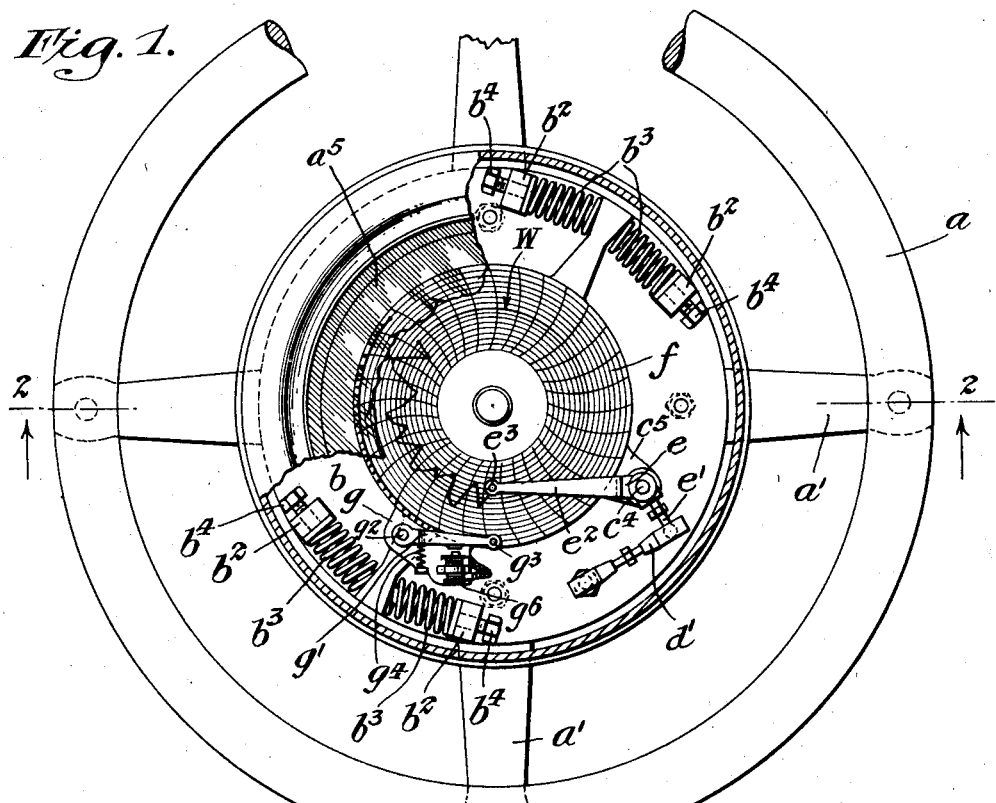
Figure 1 is a plan view, partly broken away, showing a testing device constructed in accordance with the present invention.
Figure 2:
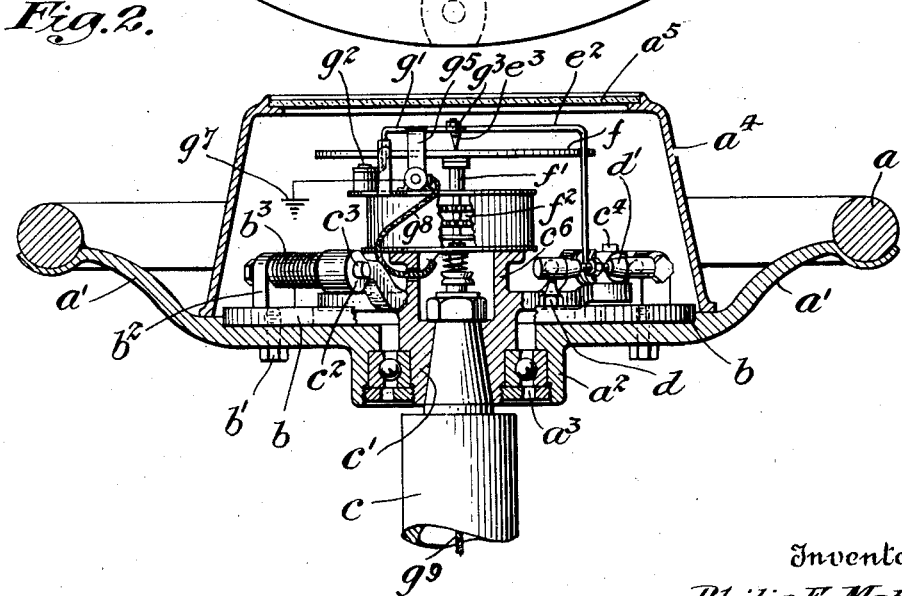
Figure 2 is a view in section, taken on line 2—2 of Figure 1, and looking in the direction of the arrows.

An upwardly extending standard $d$ is carried by the annular base $b$ and has pivotally connected thereto an adjustable link $d'$ which is pivotally secured to the short arm $e'$ of a bell crank lever $e$ pivoted upon an arm $c^5$. The long arm $e^2$ of the lever carries a suitable stylus $e^3$ for engaging a chart $f$ carried upon a vertical shaft $f'$ and driven by a suitable clock train $f^2$. The long arm $e^2$ preferably is formed as shown in Figure 1 in order that it may be mounted upon the base and be in proper engaging position with respect to the chart. The bell crank lever may be mounted upon a vertical stud $c^4$ which is carried upon an arm $c^5$ on the collar $c'$. By reason of the above connection, relative movement of the collar $c'$ with respect to the annular base $b$ will cause the stylus $e^3$ to be moved in an arcuate path across the recording surface of the chart $f$.

The collar $c'$ may be formed with an upwardly extending annular mounting means $c^6$ upon which the clock train and associated mechanism $f^2$ may be secured. From the foregoing, it will be seen that the chart $f$ will be rotated by the clock train and indications thereon will be constantly recorded by the stylus $e^3$. These indications will represent the torque required to manipulate the steering mechanism during operation of the vehicle and will thus give sufficient data upon which the characteristics of the steering mechanism may be accurately judged.

It is further desirable to provide indications on the chart by means of which the velocity of the vehicle may be determined for any given set of readings and at any given time. For this purpose, the clock mechanism $f^2$ is preferably formed with an extension plate $g$ upon which an arm $g'$ is pivotally mounted as at $g^2$. This arm is also formed with a stylus $g^3$ which is adapted to engage the periphery of the chart and normally be maintained in a given position by means of a spring $g^4$. A downwardly extending armature $g^5$ is formed on the arm and an electromagnet $g^6$ is mounted in a suitable position upon the plate $g$ to attract the armature $g^5$ and move the arm $g'$ when energized. The coil of the electromagnet may be grounded at one extremity as at $g^7$ and current supplied thereto by means of a suitable conductor $g^8$.

The conductor $g^8$ being mounted upon a relatively rotating part, preferably receives current through a conductor $g^9$ carried axially of the steering column $c$ and connected to a step button $g^{10}$. To facilitate the dismounting of the mechanism, a cooperating step button $g^{11}$ is carried by the clock mechanism and yieldingly urged against button $g^{10}$ by means of a spring $g^{12}$. The spring $g^{12}$ may be seated against a suitable terminal plate $g^{13}$ to which conductor $g^8$ is connected as shown in Figure 3. In order that the actuation of the magnet and the corresponding movement of stylus $g^3$ may be a function of the velocity of the vehicle, current is supplied to the conductor $g^9$ intermittently in proportion to the speed of the vehicle. Such supply may be afforded by means of a battery $h$ grounded at $h'$ and connected to a conductor $h^2$ which is secured to a terminal $h^3$ within a housing $h^4$. This housing may be mounted about the usual speedometer driving shaft or constitute a part of the speedometer housing. In the form shown, housing $h^4$ is carried by a fitting $h^5$ within which shaft $h^6$ is journaled. This shaft carries a gear $h^7$ which meshes with a driving pinion $h^8$ carried by a speedometer driving shaft $h^9$. Shaft $h^6$ carries a cam $h^{10}$ and actuates an intermittent circuit closer $h^{11}$ through a bearing member $h^{12}$ in proportion to the speed of the vehicle. The circuit closer $h^{11}$ is preferably pivoted upon an arm $h^{13}$ carried by the terminal $h^3$ and urged against the cam $h^{10}$ by means of a spring $h^{14}$. A contacting member $h^{15}$ is carried by the arm and adapted to engage a cooperating contact $h^{16}$ carried by terminal plate $h^{17}$. The conductor $g^9$ is connected to the terminal plate $h^{17}$ and thereby receives current impulses intermittently in proportion to the speed of the vehicle.

Such impulses form spaced radial markings about the periphery of chart $f$ and thus record the velocity of the vehicle during its test runs.

With reference to the chart $f$, it should be noted that the zero line is indicated at W, the deflections of arm $e^2$ upon either side of this zero line indicating the amount of torque required to turn the vehicle in either direction. By suitable graduations and calibrations, the variation in turning force required may be directly read from the chart. The space between predetermined radial markings of the arm $g'$ represents a fixed distance which the vehicle has traveled. This distance may be used to determine the speed the vehicle has traveled by reading it in connection with the chart $f$ which has been rotated by the timing mechanism.

From the foregoing, it will be seen that elements of the invention described herein may be varied to suit certain conditions of operation, all of the elements being adjusted to enable a predetermined standard to be utilized. The steering torque may be read directly from the chart for either right or left hand turns and the work done in foot pounds through the steering mechanism may be determined by integrating the area in the torque curve plotted thereon. The distance in feet covered by the vehicle may be determined in correct relation to the steering torque curve corresponding thereto and the speed of the vehicle during such elapsed distance may also be accurately determined.

While the invention has been described with specific reference to the accompanying drawings, it is not to be limited, save as defined in the appended claim.

I claim as my invention:

A testing device for motor vehicle steering mechanism comprising relatively movable members, said members comprising a base carried by the steering wheel and a collar member carried by the steering column, radially extending arms carried by the collar member, pairs of spaced lugs on the base, the arms extending between the lugs of the respective pairs, compression cushioning means between the arms on said collar member and the spaced lugs on the base, a chart carried by said collar member, clockwork means to move the chart, a long and short arm bell crank lever pivoted to said collar, the long arm serving as a recording arm, and a link connected between the short arm and the base.

This specification signed this 15th day of Nov., A. D. 1929.

PHILIP E. MATTHEWS.